April 13, 1954   R. ROBINSON   2,674,922
EXTERNALLY MOUNTED AND INTERNALLY ADJUSTED REARVIEW MIRROR
Filed May 24, 1950
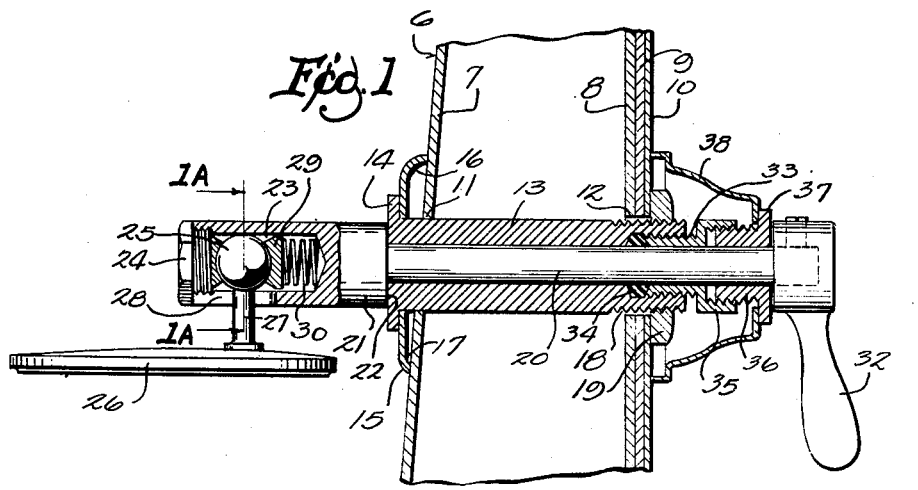
Inventor
RALPH ROBINSON
Wheeler, Wheeler & Wheeler
Attorneys Patented Apr. 13, 1954

2,674,922

UNITED STATES PATENT OFFICE 2,674,922

EXTERNALLY MOUNTED AND INTERNALLY ADJUSTED REARVIEW MIRROR

Ralph Robinson, Milwaukee, Wis., assignor to Milwaukee Stamping Company, Milwaukee, Wis., a corporation of Wisconsin Application May 24, 1950, Serial No. 163,827

2 Claims. (Cl. 88—93)

This invention relates to improvements in adjustable rear view mirrors for motor vehicles.

It is an object of the invention to provide simple and inexpensive means for effecting at least one adjustment of an external rear view mirror from the interior of a motor vehicle, while accommodating a second direction of adjustment either manually or by means operable from the interior of the vehicle.

The invention is particularly concerned with the means for mounting and actuating the rear view mirror by means of parts which are inexpensive and easily fabricated and assembled and mounted.

In the drawings:

Fig. 1 is a view in horizontal section through a vehicle door or body part and through a rear view mirror mounting which is positioned thereon.

Fig. 1a is a detail view fragmentarily taken in cross section on the line 1a—1a of Fig. 1.

Fig. 2 is a view similar to Fig. 1 showing a modified embodiment of the invention.

Fig. 3 is a view taken in section on the line 3—3 of Fig. 2.

Fig. 4 is a fragmentary detail view showing in plan portions of the parts of the device of Fig. 2 which are shown in section in Fig. 2.

Fig. 5 is a fragmentary detail view taken in the plane of Fig. 2 and showing a further modified embodiment.

Since the present invention is concerned with the mirror mounting and operating means rather than with any part of the vehicle, it is broadly immaterial whether the hollow vehicle member shown at 6 is regarded as a fragment of a door or column or some other portion of the vehicle body. In any event, it has an outer wall 7 and an inner wall 8, the latter having an applied sheet 9 which supports the upholstery or other liner 10.

The walls are pierced by registering openings 11 and 12 through which passes the mounting sleeve 13 externally headed at 14 to engage a finishing ring 15 which, because of the taper of the structure member 6 shown in Fig. 1, is desirably provided with a marginal flange which is deeper at 16 than at 17.

At its inner end, the sleeve 13 is externally threaded at 18 and upon the threads is a nut 19 engaged with the finished inner surface of the inner wall of the body member 6. The tightening of this nut securely engages the finishing ring 15 externally with body member 6 and securely positions the sleeve 13 in such member.

Rotatably mounted in the sleeve 13 is a shaft at 20 having an enlarged head 21 which provides a shoulder 22 engaged with the flange of the mounting sleeve 13. The head 21 has a socket 23 closed by a plug 24 which engages the ball 25 connected with the rear view mirror 26 by means of an arm 27 extending out through a lateral slot 28 which opens from the socket 23. The inner end of plug 24 may be arcuately surfaced to fit the ball and a floating pressure member 29 urged outwardly by a compression spring 30 within the socket engages the ball at its opposite side to hold the ball against the plug and thereby to tend to fix frictionally any position to which the mirror 26 and its supporting arm 27 may be adjusted in the plane of the slot 28 through which arm 27 projects. While the range of oscillation of the mirror and ball 25 in such plane is not great, due to the limited extent of slot 28, it is adequate to permit the mirror to be set where it will afford a person within the vehicle an advantageous view rearwardly.

In order that the field of view may be adjusted in a vertical direction, the entire mirror and the mounting as above described are rotated on the axis of shaft 20 by means of the handle 32 which is fixed to the shaft at the interior of the vehicle. Frictional pressure for maintaining the adjusted position of the parts in any rotative position to which shaft 20 may be set, is conveniently achieved by means of the screw plug 33 which is threaded into the end of the mounting sleeve 13 and is in pressure engagement with a deformable gland member 34 socketed in the end of said sleeve.

Numerous means may be employed to impart a finished appearance to the interior portions of the device. In the specific embodiment shown in Fig. 1, the end of the pressure lug 33 is provided with an internally threaded cup-shaped terminal 35 into which is screwed the tubular plug 36. A flange 37 on the tubular plug 36 engages the outer end of an ornamental shell or bezel ring 38 to hold this against the inner finished ply 10 of the structural vehicle body member 6.

The device disclosed is one in which the angle of the mirror which controls the field of view rearwardly from left to right must be set manually by positioning the mirror and its supporting arm 27 in a desired location in the slot 28 of the cavity 23 at the end of rock shaft 20. Once this angle is set, however, the operator within the vehicle can control, from the interior of the vehicle, the vertical field of view reflected by the mirror by simply oscillating the rock shaft 20 to the desired position, the variable friction exerted by the compression of the deformable member 34 serving to hold the shaft in any position to which it is adjusted. Since the width of the slot 29 is not appreciably greater than the thickness of the mirror-supporting arm 27, the angle of the mirror is necessarily controlled by the angular adjustment of the rock shaft 20.

Fig. 2 suggests several specific modifications, any one of which individually may be incorporated in the otherwise similar device of Fig. 1. Merely by way of exemplification, the structural member 61' of the vehicle has parallel sides rather than converging sides. This makes it unnecessary to use finishing ring 15 on the external side thereof. The flange 140 of the mounting sleeve 130 bears directly against the external wall 70 of member 61.

The rock shaft 200 is, for the purposes of this embodiment, tubular. The mounting of the mirror 26 eliminates the ball and its bearings as used in Fig. 1, these parts being replaced by a pintle at 250 which pivots the mirror-supporting arm 270 to the head portion 210 of rock shaft 200.

To avoid the necessity for any manual setting of the mirror at the outside of the vehicle, the arm 270 terminates in a toothed segment 40 with which meshes worm teeth 41 cut into the end of a shaft 42 which extends through the tubular rock shaft 200. A knob 43 at the inner end of shaft 42 is held thereto by suitable means such as set screw 44 which may engage the outer surface of a larger knob at 320 which is mounted on rock shaft 200 in lieu of the handle 32 shown in Fig. 1. A collar 45 may be pinned to the shaft 42 to engage the knob 320 interiorly, thereby fixing the axial position in which the shaft 42 rotates.

The position of rock shaft 200 is fixed in one direction by the abutment of its shoulder 220 with the outer end of mounting sleeve 130 and it is fixed in the other direction by the abutment of the knob 320 with a washer 46 which seats against the finishing cup 47. This cup may conveniently be threaded externally to the nut 190 which is screwed to the mounting sleeve 130 and is in thrust engagement with the inner ply 10 of the structural member 61.

In order to hold the rock shaft 200 in adjusted position against the moment to which such rock shaft is subject by reason of the offset projection of the mirror 26, the tapered end portion 48 of the mounting sleeve is exteriorly threaded and axially split as shown in Fig. 4 so that the tightening of the nut 50 thereon will compress the tapered and split portion 48 of the mounting sleeve against the rock shaft to exert any desired degree of friction.

Fig. 5 shows two different modifications, either of which may selectively be incorporated, independently of the other. In Fig. 5, the mounting sleeve 131 has an internally threaded recess at 51 into which the end of the rock shaft 201 projects. Embracing the projecting end of rock shaft 201 is a split and tapered externally threaded plug 331 having a head at 332 to which a wrench may be applied. When this plug is tightened into the recess 51, its split portions will be compressed upon the rock shaft 201 to exert any desired pressure thereon, so that the shaft will remain in any position to which it is adjusted by means of handle 32 or a suitable knob as disclosed in Fig. 2.

The other modification shown in this embodiment involves the use of the compression spring 53 confined between the head 332 of the tapered plug 331, as herein, and a portion of the specially formed bezel ring 54 at its outer end, as a means of holding the bezel ring against the surface ply 10 of the vehicle wall to conceal the friction dealing sleeve 131. The bezel ring is recessed to receive the spring 53 and has within the recess an veloping mechanism and the nut 191 of mount-annular flange 55 against which the spring seats.

I claim:

1. A device of the character described comprising a rear view mirror for external mounting on a vehicle, an arm connected with the mirror and projecting forwardly therefrom and provided at its free end with a gear segment, a rock shaft having a pintle upon which said arm is mounted, said pintle being disposed between the mirror and the segment and the rock shaft having a relieved portion for said segment, a second rock shaft extending longitudinally through the first and in bearing contact with the first rock shaft substantially throughout its length, said second rock shaft being provided with work teeth meshing with said segment in said relieved portion of the rock shaft first mentioned, a mounting member in which the first mentioned rock shaft is rotatably supported, handles for both of said rock shafts, at the inner ends thereof, and means for positioning the first mentioned rock shaft in the adjustment to which it is set by its handle, said positioning means comprising a friction brake element and a pressure exerting element in threaded connection with the mounting support and in operating connection with said friction brake element, a finishing ring substantially enclosing said friction brake element and said pressure exerting element and bearing means between the innermost said handle for said rock shaft and said finishing ring.

2. The device of claim 1 in which the friction brake and pressure exerting elements comprise unitarily an axially split and tapered threaded part in bearing engagement with the first rock shaft.

References Cited in the file of this patent

UNITED STATES PATENTS

| Number | Name | Date |
| --- | --- | --- |
| 2,005,792 | Leins | June 25, 1935 |
| 2,281,234 | Clark et al. | Apr. 28, 1942 |
| 2,299,280 | Reed | Oct. 20, 1942 |
| 2,326,316 | Allen | Aug. 10, 1943 |

FOREIGN PATENTS

| Number | Country | Date |
| --- | --- | --- |
| 819,789 | France | July 19, 1937 |
| 550,795 | Great Britain | Jan. 6, 1943 |